(12) United States Patent
Farrah

(10) Patent No.: US 7,427,995 B2
(45) Date of Patent: Sep. 23, 2008

(54) SYSTEM FOR CREATING AN ARTWORK

(75) Inventor: Timothy F. Farrah, Ringwood (AU)

(73) Assignee: Amcor Limited, Abbotsford, Victoria (AU)

(*) Notice: Subject to any disclaimer, the term of this patent is extended or adjusted under 35 U.S.C. 154(b) by 752 days.

(21) Appl. No.: 10/362,022

(22) PCT Filed: Jul. 27, 2001

(86) PCT No.: PCT/AU01/00925

§ 371 (c)(1),
(2), (4) Date: Aug. 5, 2003

(87) PCT Pub. No.: WO02/15128

PCT Pub. Date: Feb. 21, 2002

(65) Prior Publication Data

US 2004/0030997 A1 Feb. 12, 2004

Related U.S. Application Data

(60) Provisional application No. 60/226,059, filed on Aug. 18, 2000.

(30) Foreign Application Priority Data

Aug. 18, 2000 (AU) .................................. PQ9522

(51) Int. Cl.
G09G 5/00 (2006.01)
G06F 3/048 (2006.01)
(52) U.S. Cl. ........................................ 345/619; 715/788
(58) Field of Classification Search ................ 345/619; 700/97, 98; 715/502, 526, 525, 765, 517, 715/243, 700, 764, 788, 866; 283/56, 117
See application file for complete search history.

(56) References Cited

U.S. PATENT DOCUMENTS

| | | | | |
|---|---|---|---|---|
| 5,889,932 | A * | 3/1999 | Adegeest et al. | 358/1.18 |
| 6,125,374 | A * | 9/2000 | Terry et al. | 715/502 |
| 6,760,638 | B1 * | 7/2004 | Love et al. | 700/98 |
| 6,882,892 | B2 * | 4/2005 | Farrah et al. | 700/97 |
| 2005/0283722 | A1 * | 12/2005 | Warmus et al. | 715/525 |

(Continued)

FOREIGN PATENT DOCUMENTS

EP 0 227 848 5/1991

(Continued)

OTHER PUBLICATIONS

Hatakenaka, Kenji et al., "A Practical Application of a Computer to Industrial Design", Computer Graphics Tokyo '84 Proceedings, Apr. 24, 1984, pp. 240-253.

(Continued)

*Primary Examiner*—Chante Harrison
(74) *Attorney, Agent, or Firm*—Nixon & Vanderhye P.C.

(57) ABSTRACT

A system for creating an artwork includes artwork creation structure for creating an artwork incorporating an art object, and control structure for controlling the manner in which an art object can be incorporated into the artwork in accordance with a rule. When the artwork creation structure is creating an artwork incorporating an art object, the art object control structure controls the incorporation of the art object into the artwork to ensure that it is in accordance with the rule.

33 Claims, 22 Drawing Sheets

U.S. PATENT DOCUMENTS

2005/0283734 A1* 12/2005 Santoro et al. .............. 715/765

FOREIGN PATENT DOCUMENTS

| EP | 227 848 B | 5/1991 |
| EP | 0 632 408 | 1/1995 |
| EP | 632 408 A | 1/1995 |
| GB | 2 332 348 | 6/1999 |
| GB | 2332 348 A | 6/1999 |
| JP | 7-254982 | 10/1995 |
| JP | 2001-41803 | 2/2001 |

OTHER PUBLICATIONS

Computer Graphics Tokyo '84 Proceedings, Apr. 24, 1984, Japan, pp. T4-1-1-14, Hatakenaka et al 'a practical application of a computer to industrial design'.

Derwent Abstracts Accession No. 95-372337/48, Class S06, JT 7-254982 A (Mita Industries Co Ltd) Oct. 3, 1995.

Derwent Abstract Accession No. 2001-249181/26 , Class S02, JP 2001-041803 A (Fujitsu Ltd) Feb. 16, 2001.

* cited by examiner

SYSTEM FOR CREATING AN ARTWORK

DETAILS OF RELATED APPLICATION

This application is the U.S. national phase of International Patent Application No. PCT/AU01/00925 filed 27 Jul. 2001 which designated the U.S. and claims the benefit of the filing date of U.S. provisional application Ser. No. 60/226,059 filed 18 Aug. 2000 and Australian Patent application No. PQ9522 also filed 18 Aug. 2000.

FIELD OF THE INVENTION

In a first aspect, the present invention relates to a system for creating an artwork. More specifically, the first aspect of the present invention relates to controlling the manner in which art objects such as logos can be incorporated into finished artwork to be applied to, for example packages.

BACKGROUND TO THE INVENTION

Presently, packaging artworks generally include a number of art objects such as logos, barcodes, text, and pallet patterns.

It is often necessary for art objects such as barcodes to be located in a particular position or to have a certain minimum size. Further, a company may have specific rules regarding the use of their trade marks or logos. Such rules are sometimes documented in a manual, however if the person creating an artwork is not aware of the rule or chooses to ignore it, an artwork can be produced which does not comply with the requirements. When the nature of the task of creating such packaging artwork is considered, it becomes apparent that it is a very complex task where a number of people and organisations are involved in the process and there is often poor communication between the participants which can lead to unsatisfactory packaging artwork being produced which needs to be reworked prior to production. Accordingly, it would be desirable to provide an improved system which avoids some of the foregoing problems. Further, when there are changes to art objects such as logos it is difficult to determine what artworks need to be changed as a result. For example, a company may modify a brand logo and need to alter all packaging which incorporates this logo. Thus, it would be desirable to be able to automatically alter all artworks which use an altered logo when an alteration is made.

In a second aspect the present invention relates to a method and system for dividing an area of an electronic document into a plurality of selectable regions. Advantageously, the second aspect of the invention may be used in combination with the first aspect of the invention.

Previously it has been know to divide an area of an electronic document by means of a grid. A grid, generally consists of a plurality of equally spaced apart horizontal and vertical lines which have an even spacing and which divide the area of an electronic document into a plurality of equal areas. Such grid lines, are commonly used in computer programs which are used to generate artworks or drawings, but can also be used in the generation of flow charts and the like. Objects can be positioned in the document and fixed in position in a manner defined by the grid lines. An object can either be incorporated directly into the artwork or as part of a text or picture box—i.e. by defining an area within the electronic document area into which further objects such as text or pictures are to be incorporated. An inherent problem with such a system is that the grid remains fixed relative to the borders of the area of the electronic document within which it is provided. That is, typically the grid is defined in a fixed manner relative to each page of the electronic document. From an aesthetic point of view, in order to achieve balance in a document, it is necessary to define some relationship between objects which have already been incorporated into the drawing, artwork, or flow chart and future objects.

Therefore, it would be desirable to provide an alternative technique for dividing an area of an electronic document to a plurality of regions.

SUMMARY OF THE INVENTION

In a first aspect of the invention there is provided a system for creating an artwork, said system having:

artwork creation means for creating an artwork incorporating an art object; and control means for controlling the manner in which an art object can be incorporated into said artwork in accordance with a rule, wherein when said artwork creation means is creating an artwork incorporating an art object, said art object control means controls the incorporation of said art object into the artwork to ensure that it is in accordance with said rule.

Preferably, said artwork is packaging artwork.

Preferably, the artwork creation means defines a template corresponding to the package and creates said artwork by incorporating art objects into said template.

Preferably, the artwork creation means divides said template into a plurality of areas which correspond to panels of said package.

Preferably, said template corresponds to a blank layout of the package.

Preferably, said control means controls the manner in which an art object can be incorporated in said template in accordance with a rule associated with said template.

Alternatively or in addition, said control means controls the manner in which an art object is incorporated in said artwork in accordance with a rule associated with said art object.

Preferably, said artwork creation means can modify an artwork and said art object control means controls the modification to ensure that it is in accordance with any rules associated with any art objects incorporated in said artwork.

Preferably, where the modification of said artwork involves a change from a first template to a second template, said object control means controls the modification so that an art object is incorporated within the second template in accordance with the manner in which it was incorporated within the first template.

Preferably, the modification is controlled to preserve the relative position of the art object.

Preferably, the modification is controlled to preserve the relative scaling of the art object.

Preferably, said system includes rule update means for updating a rule associated with an artwork, whereafter said art object control means controls said artwork to be updated in accordance with the updated rule.

Preferably, said system is used to create a plurality of artworks and said artworks are maintained in a artwork database.

Preferably, said rule update means includes a rule database and when a rule change is made to said rule database said rule update means examines said artwork database and updates artworks relating to said rule change in accordance with said rule change.

Preferably, said rule is selected from one of:

a colour rule;

a logo rule;

a scale rule;
a placement rule;
a trapping rule;
an overprint rule;
a scale rule;
a panel rule; and
a blank space rule.

Preferably, said artwork creation means defines a grid relative to which art objects can be located.

Preferably, said system has an input means and said artwork is created by a user using said input means.

Preferably, said system has an output means in the form of a display and said artwork is displayed on said display.

The first aspect of the invention also provides a method of creating an artwork, said method including creating an artwork by incorporating an art object into an artwork, and controlling the manner in which said art object can be incorporated into the artwork in accordance with a rule, whereby when an artwork is created incorporating an artwork, the incorporation of said art object is controlled to ensure that it is in accordance with said rule.

Preferably, the method is used to create packaging artwork.

Preferably, said method includes defining a template corresponding to a package and creating said artwork includes incorporating art objects into said template.

Preferably, said method includes dividing said template into a plurality of areas which correspond to panels of said package and locating art objects within said panels.

Preferably, said method involves controlling the manner in which an art object can be incorporated in said template in accordance with a rule associated with said template.

Alternatively, or in addition, said method involves controlling the manner in which an at object can be incorporated in accordance with a rule associated with said art object.

Preferably, said method further includes modifying an artwork and controlling the modification of the artwork to ensure that it is in accordance with any rules associated with any art objects incorporated in said artwork.

Preferably, where modifying the artwork involves changing the template, the method includes controlling the modification so that when an art object is incorporated within the changed template it is incorporated in accordance with the manner in which it was incorporated within the original template.

Preferably, said method further includes updating a rule associated with an artwork and controlling said artwork to be updated in accordance with the updated rule.

In a second aspect, the invention provides a method of dividing an area of an electronic document into a plurality of selectable regions, the method including the steps of:
  establishing an electronic document area;
  locating within the document area an object to form part of an electronic document;
  surrounding said object with a plurality of grid lines to bound said object into a region;
  said grid lines extending to the perimeter of said document area to thereby divide said document area into a plurality of regions; and
  permitting selection of any one of said plurality of regions.

Preferably, said regions are rectangular.

Preferably, said grid lines surrounding said object bound said object by the smallest rectangle into which said object fits.

Preferably, the grid lines are parallel to respective edges of said area.

Preferably, said method permits the selection of a plurality of regions.

Preferably, said method includes locating a plurality of objects within said area and surrounding each said object with a plurality of grid lines, whereby the grid lines which surround each object co-operate to divide said area into a plurality of regions.

Preferably, said method includes generating a plurality of further grid lines parallel to the edges of said area, whereby said further lines co-operate with the grid lines surrounding each object to divide said area into a plurality of regions.

Preferably, said method permits selection of a region by means of a pointing device being operated to point inside said region.

Preferably, said method permits selection of a region by means of a pointing device being operated to point which the grid lines which comprise the perimeter of said region.

The second aspect of the invention also provides a system for dividing an area of an electronic document into a plurality of selectable regions, the system including:
  a display means;
  a computer programmed to establish an electronic document area and to display said document area by means of said display,
  said computer being operable by a user to locate within the document area an object to form part of an electronic document,
  said computer being programmed to surround said object with a plurality of grid lines to bound said object into a region,
  said grid lines extending to the perimeter of said document area to thereby divide said document area into a plurality of regions, and
  said computer being operable to permit selection of any one of said plurality of regions by a user.

Preferably said computer is programmed so that said grid lines surrounding said object bound said object by the smallest rectangle into which said object fits.

Preferably, the grid lines are parallel to respective edges of said area.

Preferably, said computer is operable to permit the selection of a plurality of regions.

Preferably, said computer is operable to locate a plurality of objects within said area and said computer is programmed to surround said object with a plurality of grid lines, whereby the grid lines which surround each object coral operate to divide said area into a plurality of regions.

Preferably, said computer is operable to generate a plurality of further grid lines parallel to the edges of said area in response to a user command, whereby said further lines co-operate with the grid lines surrounding each object to divide said area into a plurality of regions.

BRIEF DESCRIPTION OF THE DRAWINGS

Embodiments of the first and second aspects of the invention will now be described in relation to the following drawings in which:

FIG. 23 shows how the sub-divided regions of FIGS. 21a to 21c and FIGS. 22a to 22c can be combined.

DESCRIPTION OF THE PREFERRED EMBODIMENT

In the preferred embodiment, the system of the first aspect of the present invention is used to create packaging artwork which is typically to appear on cardboard boxes. It will be apparent that this system can be used to generate packaging artwork for other types of packages.

The preferred system is embodied in software to be run on a computer. The software includes means for creating an artwork by locating one or more art objects within a template and interacts with normal computer functions so that a user uses input means in the form of peripheral devices such as a keyboard and a mouse to interact with the software to create an artwork which is displayed on a computer monitor. The template may be predefined and retrieved from a database of templates corresponding to the style of packaging or if there is no existing template, a template may be defined to correspond to the new package style or an existing template may be modified. The templates include version control information to allow the identification and control of templates.

As described herein, an art object may be text such as a nutrition statement; a barcode, a warning symbol; a pallet pattern arrangement or any other element which needs to be incorporated into a packaging artwork.

Art objects are stored in library databases such as logo library databases. These art objects have associated with them sets of rules which can control their placement, scaling, colour, font etc of the object. The individual record for each art object will also have the filename, creation and modification dates, as well as the version number of the object so that the object can be tracked by searching object management information associated with each artwork.

Figure 1:
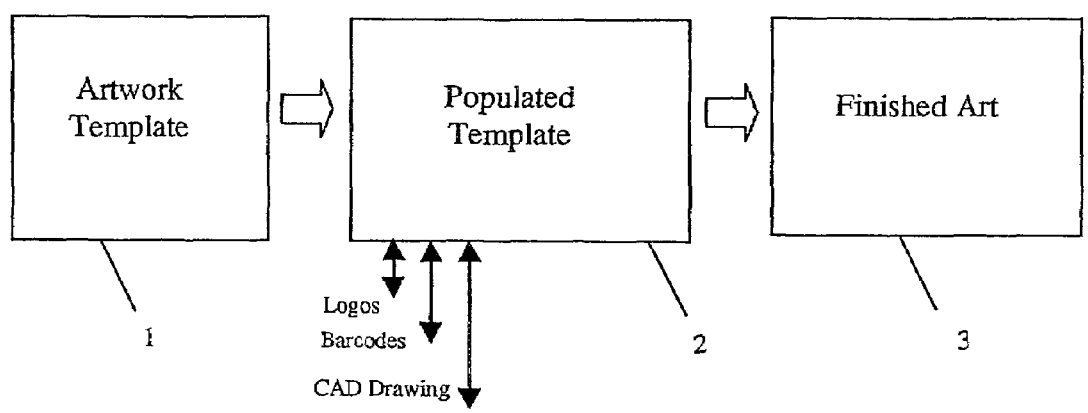
FIG. 1 shows the process for creating an artwork in accordance with an embodiment of the first aspect of the present invention.

FIG. 1 shows the process that is used in the preferred embodiment to create an artwork and the object management information which is generated to subsequently manage that artwork.

At step 1 an artwork template is retrieved or generated. At step 2 an artwork template is populated by art objects such as logos, barcodes, or CAD drawings to produce a populated template. The populated template contains object management information (OMI) which can be used to generate finished art at step 3 and also to manage the artwork at a later date. The process of populating the template is performed under control of an object control means which ensures that the art objects are incorporated into the populated template in accordance with any rules associated with art objects or the template so that these rules are obeyed in the finished artwork.

When a library object is used in an artwork the version control information of the OMI will be embedded in the artwork as for example:

- text on a separate layer which is not printed in commercially supported formats (for example Adobe Illustrator),
- text with no Stroke or Fill which is not visible in some commercially supported products,
- as annotations,
- embedded in the raw file as DSC (Document Structuring Convention) comments for example.

This information can then be searched by using a search engine to find artworks which contain certain objects, a good example is when a brand logo is modified, it will be useful to know which artworks have used the superseded logo. Having located these artworks they may be upgraded with the new logo either manually or automatically if the object was 'placed' as an external reference file. They may also be only flagged such that when they are accessed in future a message is envoked, which says that the content is out of date, the file may also be locked so that it can't be used until the artwork including the art object is updated.

Further, all rules associated with an object are included within the OMI. Hence, once the system has created an artwork, any artwork can be readily redefined for example, if the panel sizes are changed, the system will reconfigure the artwork in accordance with the rules associated with each of the art objects to form a new artwork. If a rule is violated by the proposed redefinition then the change will not be allowed. Similarly, if there is a change to a logo, the object management information layer of the artwork can be queried to find logos which are to be changed and all artworks requiring the change can be updated and any plate incorporating the artwork can be tracked and replaced as necessary.

It will be apparent that rules for art objects which are embedded into the object management information can either be pre-existing at the time an initial artwork is created or defined by the creation of a particular artwork or template. Examples of pre-existing rules are the bar codes and logos discussed previously. Other rules, such as the relevant placement of objects are incorporated into the object management information under control of the user creating the artwork. In this manner, should the artwork be redesigned, say to fit the artwork to a different sized package, the relative positions defined in the first artwork can be imported into the second artwork. Thus, if an artwork is defined relative to a template and there is a change of template, the existing rules of the initial artwork will be preserved in the artwork created using the second template.

In order to facilitate further understanding of the invention various manners in which art objects may be incorporated into an artwork relative to a template themselves will be described.

Precedence rules can be used to specify levels of precedence for art objects such that certain rules can override other rules and can drive behaviour of lower level objects. For example a barcode may be assigned a higher level of precedence than a Brand Logo such that the logo will be resized to accommodate the barcode until it reaches its limit and the template reports a conflict. Objects having a low precedence level may be influenced by higher level objects to the point where they are not included if they don't fit, they could be described as dispensable.

Each template can use conventional co-ordinate geometry to define positions of panels and objects. The location of objects in packaging artwork is best described within the frame of reference of an individual panel, this is especially useful where object arrangements are repeated in other panels. Thus, an element arrangement can be defined essentially in a two step process where objects are positioned relative to a first panel and then this positioning is repeated in a second panel. The specification of the relationship of one panel to another can define that the rotation of one panel to another to ensure that art objects on the various panels are correctly oriented.

For consumer packs the style template will describe which is the main display/selling panel, the side panels and back panel, similarly for shippers the template will identify the main panel and minor panels because art objects may have rules that apply according to which panel they are being incorporated into. An example is that a barcode on a main panel of a shipper can't be less than 100% magnification but can go to 90% on a minor panel. Similarly, nutrition statements which normally go on side panels may be allowed to move to the back panel if the side panel is too small.

Figure 16:
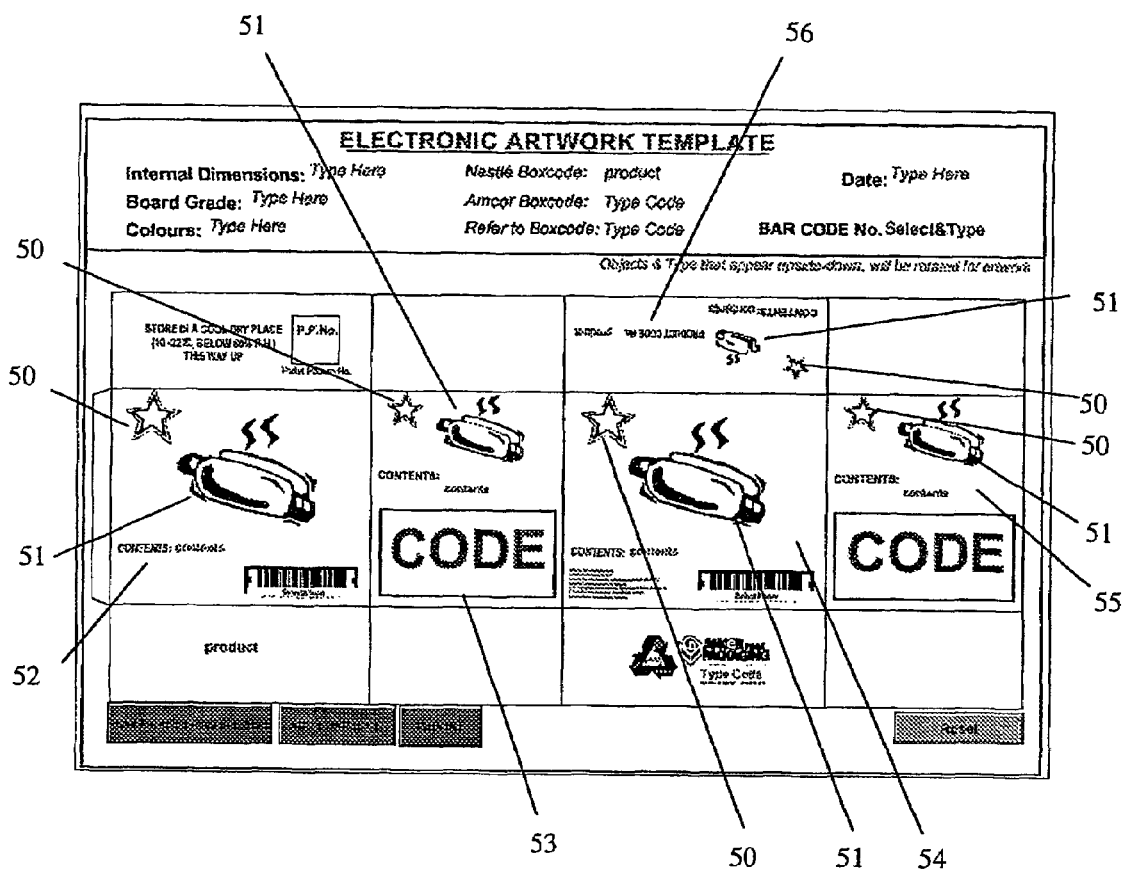
FIG. 16 shows a graphical interface for creating a packaging artwork.

Referring to FIG. 16 a star logo 50 and a hot dog logo 51 are located in each of panels P(2,2)52, P(3,2)53, P(4,2)54, P(5,2)55, and P(4,3)56. It will be apparent that the relative positions of these two logos are the same for each panel, whereas the sizes are different in different panels. For example, the logos are longer in P(4,2)54 than in P(5,2)55 or P(4,3)56. Similarly, there is a different rotation of the objects in P(4,3)56 than in, for example, panel P(4,2)54.

A panel array defines the number of panels of the layout in the X and Y directions. The expression: DIM P(5,3) defines a layout with five horizontal panels by three vertical panels. After the panel array has been declared, individual panels can be referred to as P(X,Y) e.g. P(3,2) is panel three across and two up from the left bottom corner of the panel array which is used consistently as the reference point throughout the invention. Co-ordinates can be either local or global. Local co-ordinates define locations within a panel whereas global co-ordinates relate to the whole blank. The origin of a global co-ordinate is the intersection of a left most and lowest panel edges of the whole layout and the origin of each panel is the left bottom corner. Obviously, the local co-ordinates can be mapped to global co-ordinates and vice versa. Further, in cases where the packaging blank is used to produce a package which has a definite upper or lower surface, then it may be desirable to define a relationship between the blank layout and the three dimensional finished pack which will be constructed to ensure that information appears on the correct surface. Another example is that a main panel may be required to have a barcode having 100% scaling whereas a minor panel such as a side panel may have a barcode having 90% scaling.

Figure 17:
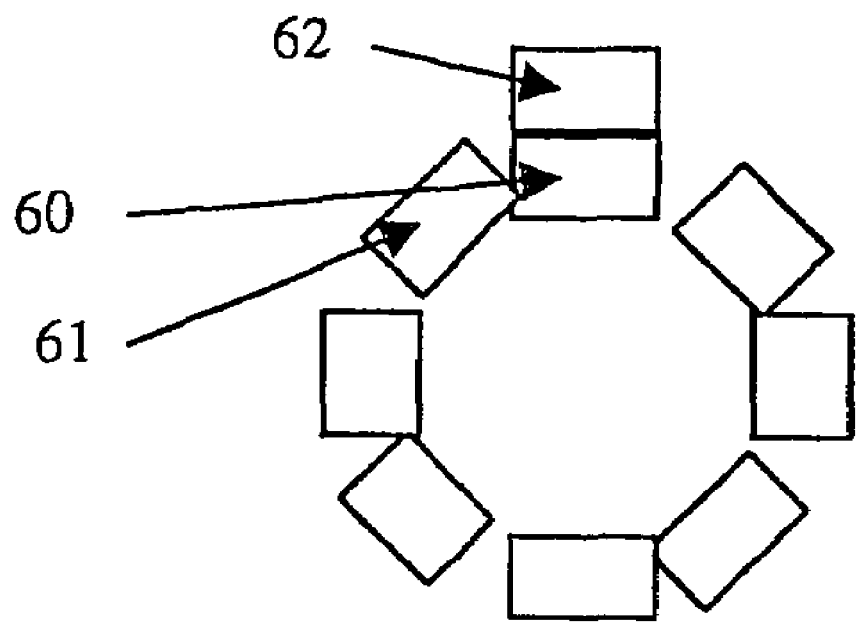
FIG. 17 shows a polar panel array.

A panel array may also be polar as with octagonal trays etc in which case the base panel is P(0,0). The panels are then described counter clockwise from 12.00 o'clock the first co-ordinate being the number of panel around the base and the second being the level radiating out from the base panel. Referring to FIG. 17, P(1,1)60 is at 12.00 o'clock $1^{st}$ level P(2,1)61 is the next panel around the base still at level 1, P(1,2)62 is at 12.00 o'clock but at level 2.

The templates use the CAD blank definitions to establish panel sizes and positions so that the blank and the graphics layout can be merged in correct register.

Figure 2:
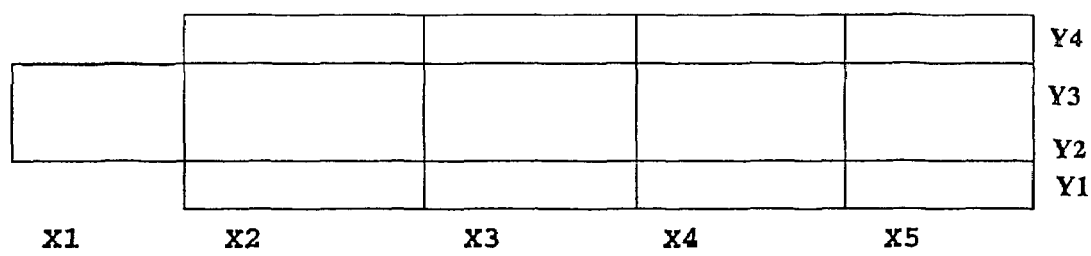
FIG. 2 shows a typical blank style.

Referring to FIG. 2, a style blank is defined using CAD Grid eg:

| | |
|---|---|
| X1 = 0 | Y1 = 0 |
| X2 = GL | Y2 = (W + A2)/2 |
| X3 = X2 + L + A2 | Y3 = Y2 + D + A2 + T |
| X4 = X3 + W + A2 | Y4 = Y3 + (W + A2)/2 |
| X5 = X4 + L + A2 − SL/2 | |

Where L=pack length, W=pack width, D=pack depth, GL=glue lap, SL=slot width, and A2=creasing tolerance.

Panel sizes are defined using the Grid values to define vertices. The panels are mostly rectangular but can be closed polygons with any numbers of vertices. For example, P(3,1)=(X3, Y1)TO, (X4, Y1)TO, (X4, Y2)TO, (X3, Y2)TO P(2,2)=(X2, Y2)TO, (X3, Y2)TO, (X3, Y3)TO, (X2, Y3)TO Nine reference points are defined for each panel.

| | | |
|---|---|---|
| PLT = Left Top | PCT = Centre Top | PRT = Right Top |
| PLC = Left Centre | PCC = Centre Centre | PRC = Right Centre |
| PLB = Left Bottom | PCB = Centre Bottom | PRB = Right Centre |

Individual co-ordinate values can also be derived from panels:
PCX=Panel Centre X value
PCY=Panel Centre Y value
PX=Panel Width
PY=Panel Height Having defined the template that forms the basis of an artwork, it is necessary to describe the manner in which art objects can be incorporated into the template, to populate the template and create the artwork.

Art objects fall into two groups, some objects being variable with regard to their scale, and some objects having scaling which is fixed to one scale or restricted to changing by fixed steps.

In a first group, where art objects can change size freely within the constraints that the template imposes, more often than not, their scale is proportionate to the overall panel size. Where art objects can be variably scaled the best practice is to determine generally agreeable proportions of each art object to a typical panel size to thereby set up default relationships. For example for an art object which is a major brand logo, a rule could specify that the logo take up 50% of the panel width and 30% of the panel height. The location of the logo could also be expressed in terms of proportion. For example, the logo may be anchored to the Left Top (LT) of the panel then offset 15 percent of panel width horizontally & vertically.

The second group are those art objects which have fixed scaling, they may change their size but if they do they will increment or decrement through fixed scale, they may have a minimum size, a default or reference size, and a maximum size. A good example of this type of art object is a barcode which for corrugated boxes has a default size known as 100% magnification, the minimum is 90% and the maximum is 120%. Barcodes typically are generated to have dimensions of 160 mm high by 40 mm wide—this size is deemed to be the 100% magnification. Thus, the barcode has a rule which controls its size. The rule may further specify that while the 90% minimum is allowable in some circumstances and 100% is the default size, 120% is preferred on larger panels to increase the potential for correct scanning. Another art object which has fixed scaling is the 'clear space bar' which is normally placed on a large panel and positioned at a fixed distance from the bottom of the panel, and with a fixed height, extending across the full width of the panel. Such clear space areas are used for ink jet printing of information while the package travels along a conveyor belt.

The presence of these fixed scale objects significantly impacts on where and how other art objects are placed and scaled on a panel. Where a panel has both a barcode and a 'clear space bar' typically all the art objects that are in the lower portion of the panel below the clear space bar, have few scaling options vertically. The area above the 'clear space bar' is known as the variable scaling region, in this region elements can derive their proportions from the overall proportions of a panel width and the vertical dimension above the 'clear space bar'.

The fixed scale art objects in a panel also determine the minimum size a panel can be in order to accommodate a particular graphics layout. For example a panels vertical size cannot be less than the top of the 'clear space bar', and the panel cannot be less than the barcode width with some margin added. This prevents the inadvertent creation of artworks which do not comply with the rules of a combination of objects. In practice, the system will prevent the incorporation of an art object into an artwork if its incorporation is not in accordance with a rule associated with the object and the user will have to alter the artwork accordingly, unless, for example, a precedence rule can be invoked to resolve the problem.

Virtually all art objects when being scaled will need to stay in proportion; that is their aspect ratio needs to be equal to one. If an art object is defined to have its scaling as 50% of the panel width, and 30% of the panel height, this may define an area which is disproportionate with regard to the art object itself. This can be considered a sub-rule of the size rule. In this case the smaller scaling of the two is used both horizontally and vertically to ensure that the placed art object remains in correct proportion and does not extend outside the allowable area.

Similarly, objects may need to be in proportion relative to one another. For example a corporate logo might be scaled relative to the panel but in doing s may become larger in proportion to the brand logo than appropriate. In which case, it should be resized according to a rule describing the relationship between the corporate and brand logos. This can happen after the corporate logo has been placed in the artwork, if for example, the corporate logo needs to be positioned first and the position of the corporate logo defines the position of the brand logo.

Figure 3:
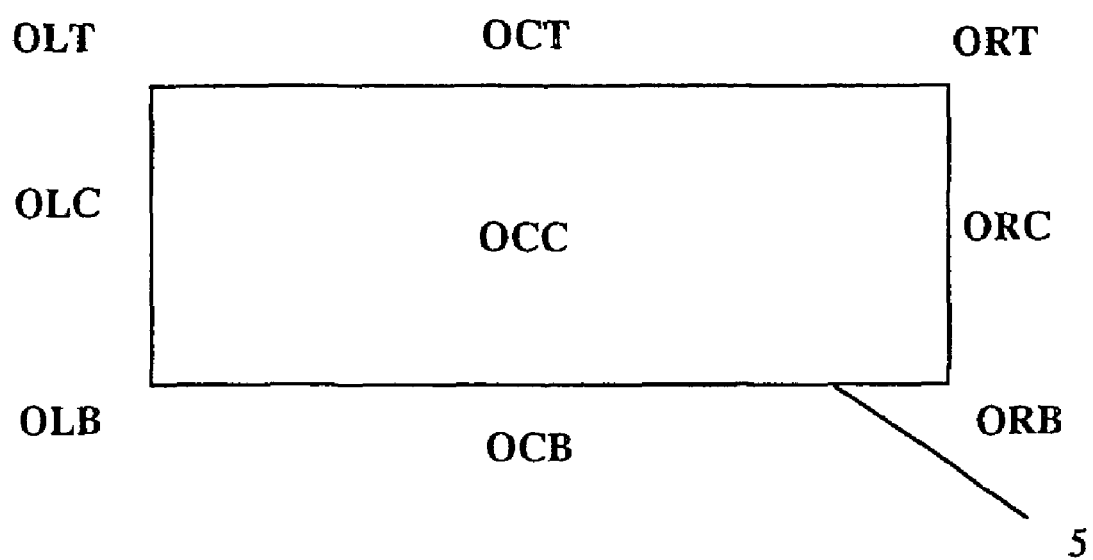
FIG. 3 shows how reference points can be defined relative to an object.

Referring to FIG. 3, nine reference points are for each art object 5 identified by:

| | | |
|---|---|---|
| OLT = Left Top | OCT = Centre Top | ORT = Right Top |
| OLC = Left Centre | OCC = Centre Centre | ORC = Right Centre |
| OLB = Left Bottom | OCB = Centre Bottom | ORB = Right Bottom |

An art object can also have individual co-ordinate values for reference when placing other objects:
OLX=Left X
ORX=Right X
OBY=Bottom Y
OTY=Top Y For example, an object can be positioned relative to the left bottom corner of another object.

There are 3 ways to position an art object in a given panel; direct placement, the picture box technique, and the text box technique.

Direct placement of an art object in a panel requires a user to specify an object reference point and a panel reference or reference to a previously placed object. For example, if the user specifies OCC>PCC this places the centre of the object in the centre of the current panel. Alternatively ORB>PRB, offset (−19, 19) places the right bottom vertice of an art object at a point offset 19 mm left and 19 mm up from the right bottom vertice of the panel (this is a typical barcode object position). It will be apparent that other units can be used to define offsets.

A picture box is a container into which any art object selected by the user such as a logo from a library of logos can be inserted, it is a convenient device because it controls scaling independently of the included art object itself. It may be convenient for example to use picture boxes to define a horizontal band of art objects which need to be proportionately spaced across a panel. The scale of each art object will be determined such that it does not exceed the size of the picture box and may also require a border or inset which can be part of the Picture Box definition. The Picture Box will most often have the aspect ratio of the art object set to one but it may be useful at times to have the art object scale disproportionately. The Picture Box is thus, itself a secondary art object which can incorporate one or more primary art objects.

Text boxes can also be used, the size of the Text Box and the amount of text will determine the size of the Font used, if the Text Box is set to multi-line it will allow wordwrapping. A Text Box may also allow a certain amount of disproportionate scaling of the font and may also invoke adjustments to kerning, tracking (overall character spacing), and leading (space between lines of text) to fit the text into the defined space.

Art objects are also allocated an Object Array Number—e.g. 0(1) is the first object to be defined, 0(2) the second object and so on. The object array is local to the panel so that renumbering is easier, the system however tracks the objects globally. Objects can be repeated into another panel in the same arrangement, but may be subsequently modified.

Figure 4:
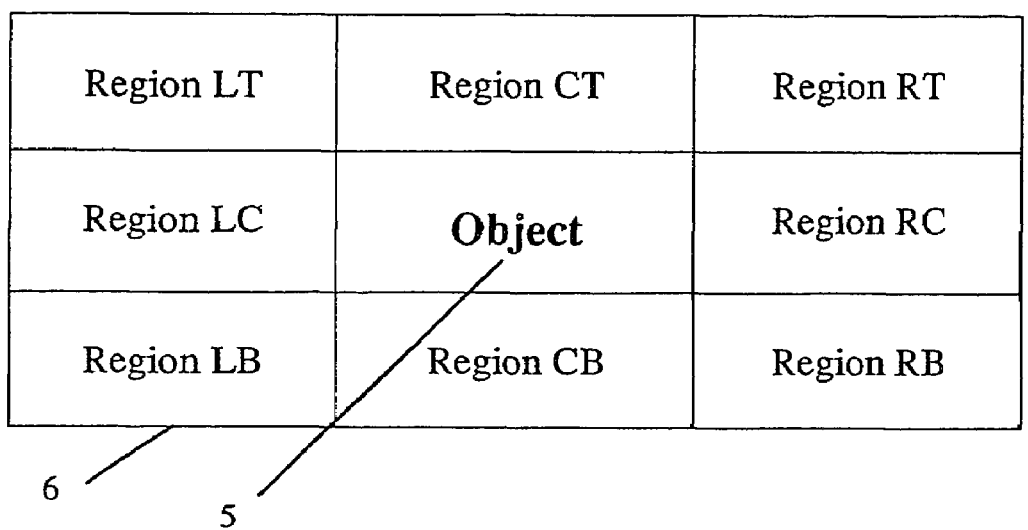
FIG. 4 shows how regions can be defined relative to an object.

The nine reference points for each art object are identified by 0(n); where n is the number of the object.
0(n)LT=Left Top
0(n)LC=Left Centre
0(n)LB=Left Bottom
0(n)CT=Centre Top
0(n)CC=Centre Centre
0(n)CB=Centre Bottom
0(n)RT=Right Top
0(n)RC=Right Centre
0(n)RB=Right Bottom Object co-ordinate codes are:
0(n)LX=Left X
0(n)RX=Right X
0(n)BY=Bottom Y
0(n)TY=Top Y The order of the objects will be consistent with the 'Paint Order'—i.e. if an object is defined after another one and they overlap, the later art object will paint over the first While many art objects are placed relative to the nine panel reference points, others need to be positioned relative to a space left after one or more art objects have been placed previously. These spaces are called Regions and there are twelve of them that can be referenced relative to a placed object 5 and a panel 6, eight of these regions are shown in FIG. 4, where L=left, C=centre, R=right and B=bottom.

Figure 5:
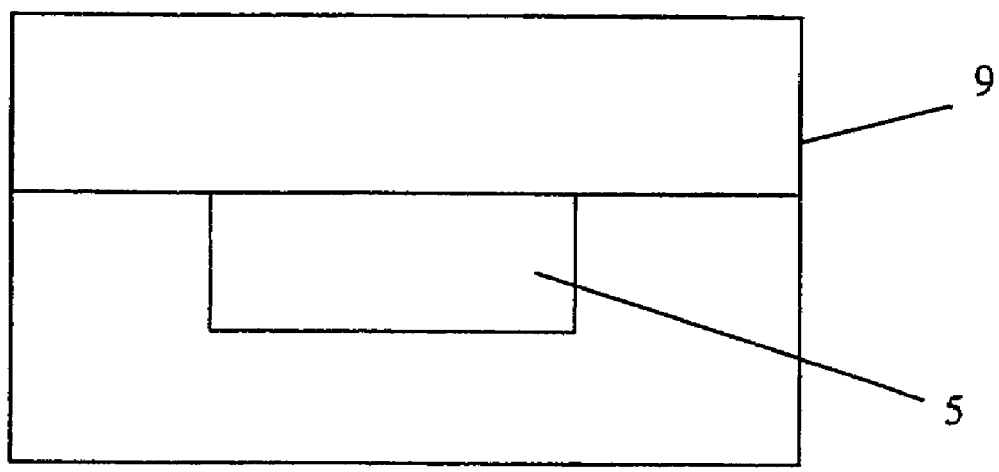
FIG. 5 provides further explanation of the use of regions in the present invention.
Figure 6:
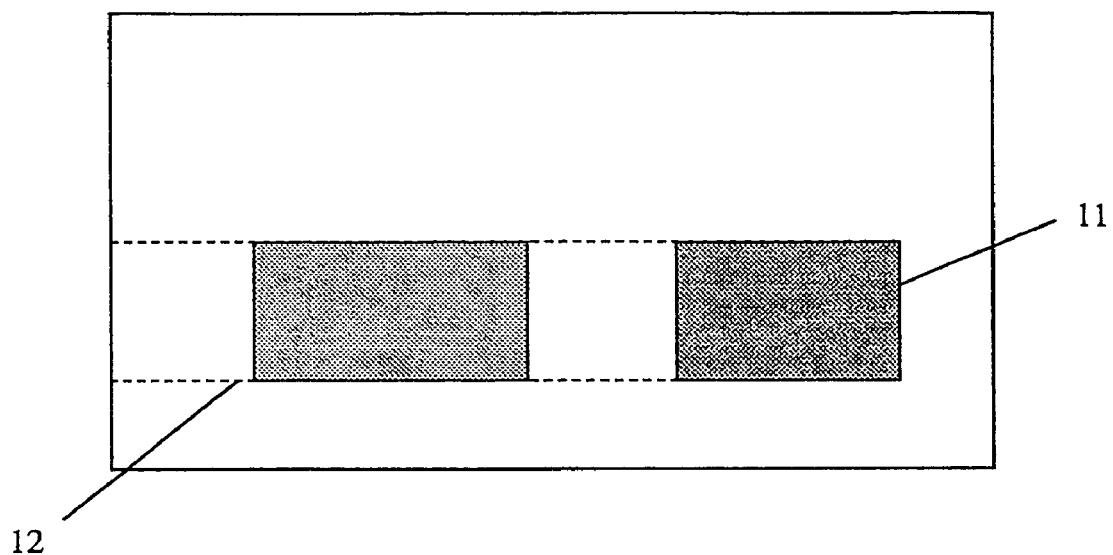
FIG. 6 shows how regions can be used to define relative artwork locations.

Also there are regions which cover the whole panel in one axis. For example, referring to FIG. 5 Region T (i.e. T=Top) 9 encompasses all of the panel above the object. Similarly, Region B is all of the panel below the object, Region L is all of the panel left of the object, and Region R is all of the panel right of the object. Thus, Region T is made up of Regions LT, CT and RT. Region R is made up of Regions RT, RC and RB etc. For example, the relationship: 0(12)CC>0(11) Region LC(CC) illustrated in FIG. 6 means that the twelfth art object's centre is to be centred in the Region Left Centre of the eleventh art object.

Similarly, the expression 0(6)CC>0(5) Region RC(CC) means the sixth art object's centre is to be centred in the Region Right Centre of the fifth object.

Again, the expression 0(7)CC>0(6) Region T(CC) means that the seventh art object's centre is to be centred in the centre of the panel in the Region Top of the sixth art object.

Figure 7:
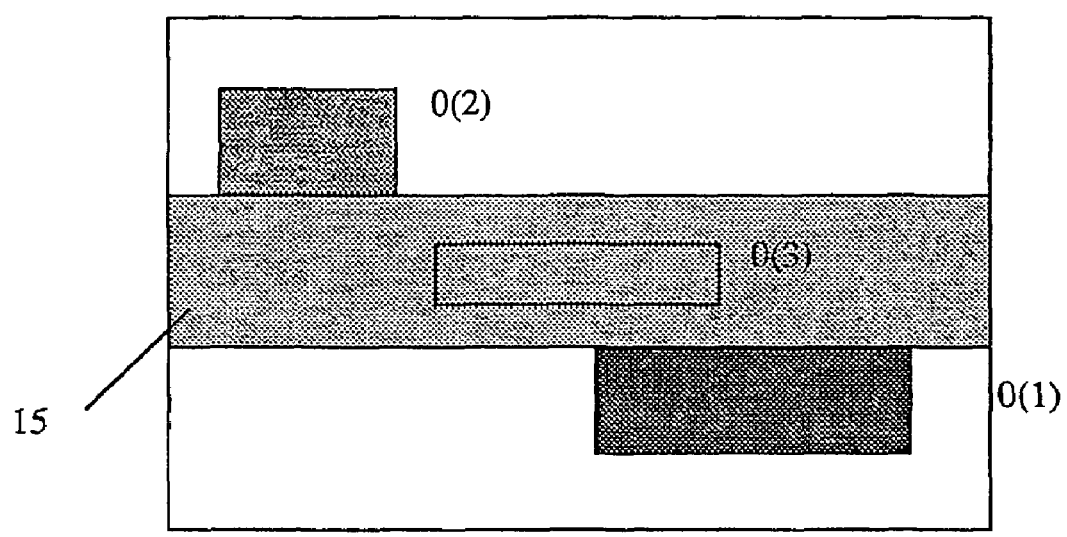
FIG. 7 shows how intersections of regions can be used to define art objects location.

Regions can also be defined by the intersection of other regions defined by multiple art objects in the panel. Referring to FIG. 7, the expression 0(3)CC>Intersection (0(1)Region T+0(2) Region B)(CC), says that the third art object 0(3) will be placed at the centre of a region 15 which is the intersection of the region above 0(1) and the region below 0(2).

Figure 8:
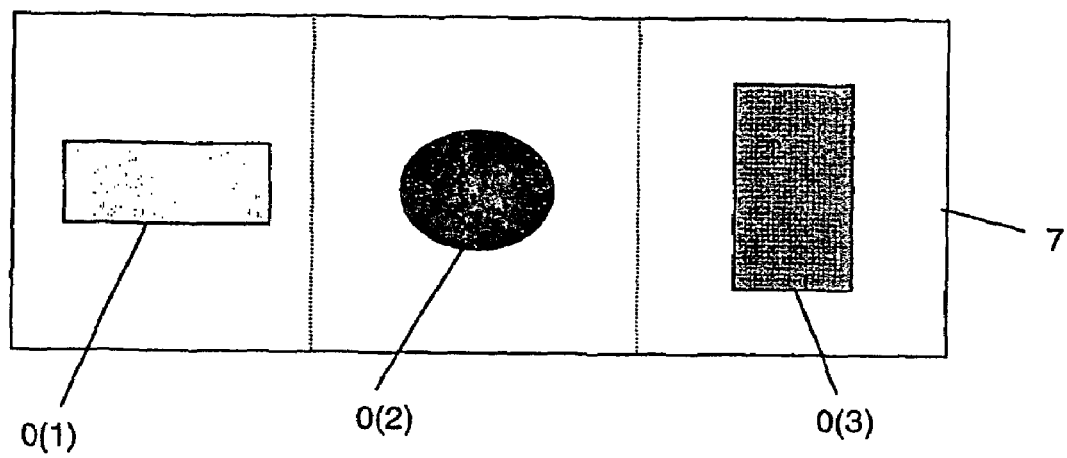
FIG. 8 shows how a grid may be used in the present invention.

Art objects sometimes need to be placed at even centres across a panel so panel regions may need to be defined. The definition Dim PG(3,1) which declares that a panel has three horizontal regions and one vertical region. An example of regions defined by the expression is shown in FIG. 8.

The position of at objects can then be defined relative to the regions. The expressions:

0(1)CC>PG(1,1)CC

0(2)CC>PG(2,1)CC

0(3)CC>PG(3,1)CC place three objects 0(1), 0(2) and 0(3) at even spacing on the panel 7.

Art objects can be lines defined using any combination of:
absolute co-ordinates;
panel references; or
other object references.

Lines are drawn directly at the positions nominated. For example:

0(7)=Line(PL,PT−10)−(PR,PT−10);Stroke=Black; Weight=20;Style=Dashed(10,10), defines a black dashed horizontal line having a weight of twelve extending from the left of the panel, ten units down from the top to the right of the panel ten units down from the top.

0(8)=Line(PL,PT−10)−(PR,PB+70);Stroke=Black; Weight=20;Style=Dashed(10,10), defines a similar diagonal line extending from the left to the right of the panel from 10 units from the top to 70 units from the bottom. As panel left is defined as being zero, the value of panel right is the same as the panel width. Similarly, because panel bottom equals zero, the value of panel top equals the panel height.

A rectangular object's size can be defined by the expression Rect(x,y). The defined object is then placed.

The expression 0(6)=Rect(PR−20,PT/3);Fill=PMS3234; Stroke=None, defines a sixth object which is a rectangle having a width of the panel width minus 20 units and a height which is one third of the panel height. The expression 0(6) CT>PCT;Offset(0,−20), aligns the centre top of the sixth object with the panel centre top with an offset 20.

Zones such as 'No Print Zone' can be defined as rectangles, for example:
0(8)=Rect(PR,30) Fill=None;Stroke=None
0(8)CB>(CPX;0(3)T);Offset(0,5).

Figure 9:
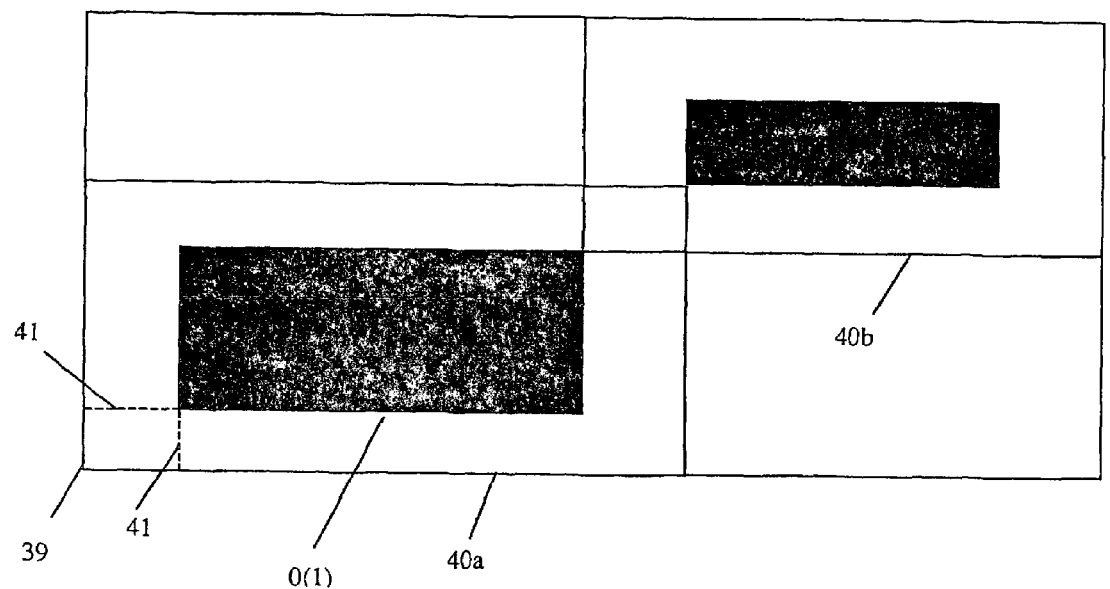
FIG. 9 shows how a blank space rule may be used in the present invention.

The expression Clear(L,B,R,T) defines a border around an art object which must be kept clear, the values L,B,R,T are the margins on Left, Bottom, Right and Top that the object must be away from a panel edge or other object. For example, as shown in FIG. 9 (which is not to scale), the expression 0(1) LB>PLB;Clear(10,10,10,10) means that the first object located left bottom is anchored to the panel left bottom 39. As shown in FIG. 9, a clear area ten units is defined around the fifth object causing the first object to be offset by 10 units from the left and bottom edges of the panel respectively as indicated by item 41. As shown in FIG. 9, clear spaces 40*a*, 40*b* can overlap so long as the objects do not intrude into the clear space.

In many cases one or more colours will change according to the product being packed. The template will have colours specified by number Col(1), Col(2), Col(3) etc and they will have a default value for viewing but the actual output colours will need to be specified at runtime (defaults can be used). They can be specified as Black, White, RGB(R,G,B) CMYK (C,Y,M,K) or PMS(nnnn)—i.e. according to any known or suitable technique. Once a colour has been set it may apply to all subsequently defined objects.

Colour rules may include rules relating to whether the colours can be flattened if used on a shipper (i.e. 3 colours on a primary pack may or may not be converted to one colour on the shipper in which the primary packs are contained).

Similarly, certain colours are inappropriate for barcodes (e.g. red and red based colours) because there will not be enough contrast when scanning. If the user tries to assign a bad colour to the layer which includes the barcode a warning is issued or the assignment of that colour can be prevented.

Figure 18:
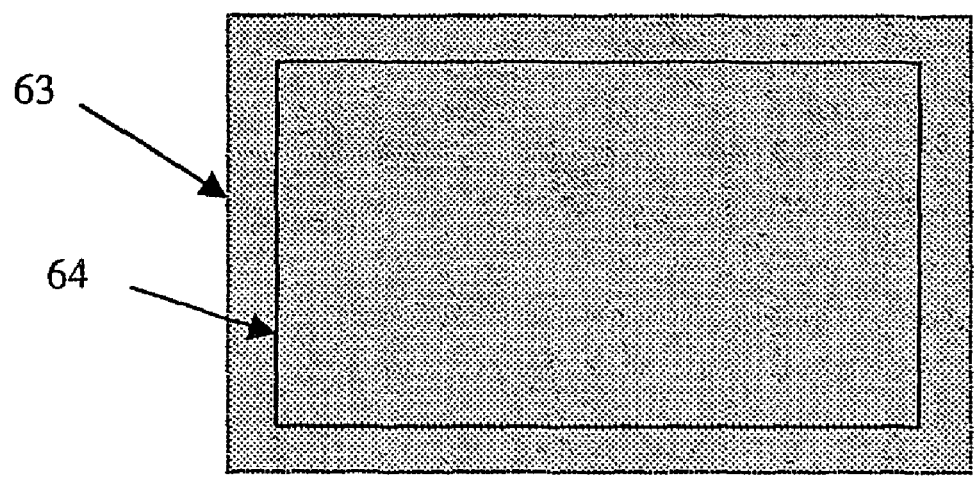
FIG. 18 shows how a bleed line may be defined.

As shown in FIG. 18, the system can also be used to add a bleed line 63, which defines a region of overall colour (which 'bleeds' out beyond the edges of a panel 64 to ensure that no 'white space' is seen if there is any misalignment of closure panels).

The system can apply a nominated colour to the region defined by the bleed lines.

Figure 19A:
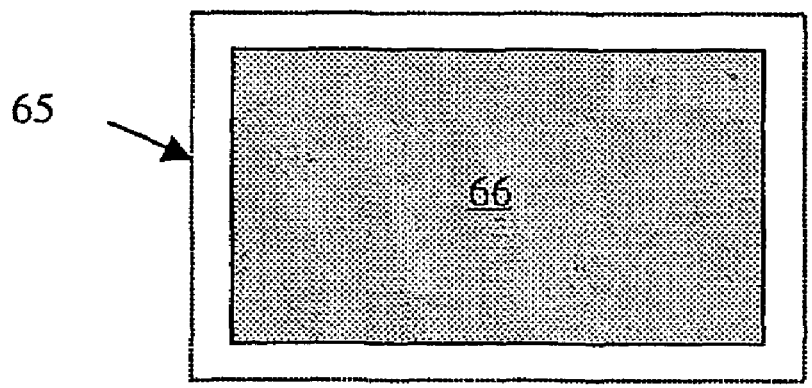
FIGS. 19a and 19b shows how an offset rule may be used.
Figure 19B:
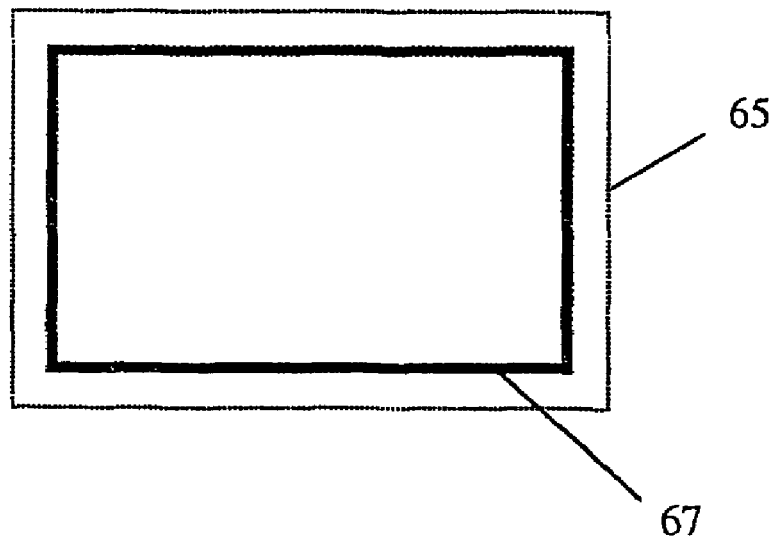

A rectangle or block of colour can be defined by an Inset distance from a panel or other container edges 65. As shown in FIG. 19*a*, the expression: Panel Inset(10,10,10,10) Fill Yellow, defines a panel 66 inset by 10 mm from all of the panel edges and filled with the colour yellow. Similarly, the expression: Panel Inset(10,10,10,10) Stroke Blue 6 pt, defines a 6 pt blue line 67 inset by 10 mm from all of the panel edges as shown in FIG. 19*b*. Insets can belong to Panels or Rectangles or Regions. When they are declared they become new working size so that fills or strokes apply to the inset size not the original. Furthermore, if an object's size is being determined by filtering into a region, and the region has an inset, the object will size to the inset. Thus, the inset is an example of a template based rule.

Some objects such as 'banners' and 'star bursts' often overlap other objects, this can be done by defining an offset as described above but only if the object rules allow overlap of certain object types, otherwise the clear space or margin rules apply.

Figure 20:
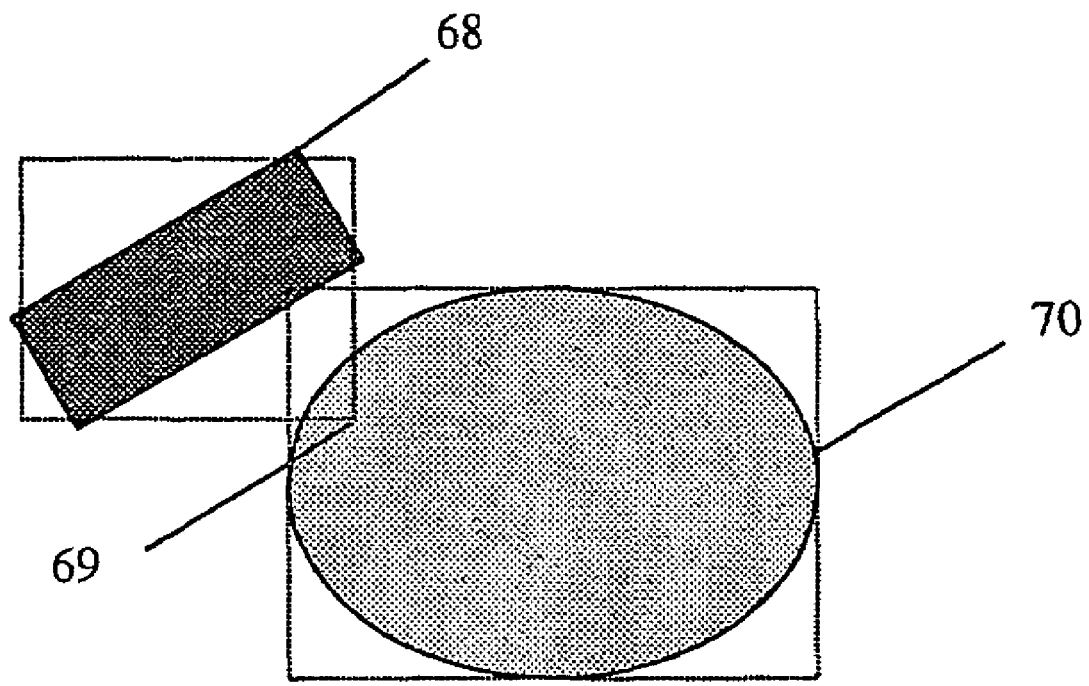
FIG. 20 shows another use of an offset rule.

The expression O(2)RB>O(1)LT Offset (10%, -15%) is illustrated in FIG. 20. This says that the Right Bottom 69 of a second object 68 is anchored to the LeftTop of a first object 70 but offset by 10% of the width of the first object and 15% of the height of the first object. The offset can be in fixed dimensions (mm) or as a proportion of the object being overlapped.

Objects can also belong to a Layer which may have the same colour or other common attribute which facilitates things like assigning colours or printing order to manage things like overprint and colour separation. The Layer concept is well implemented in existing software packages such as Adobe Illustrator.

Either layers or special colours can be used to distinguish which elements will be on the printing plate and which will not. For example, a title block and the die line need to be on the proof but not printed.

Figure 10A:
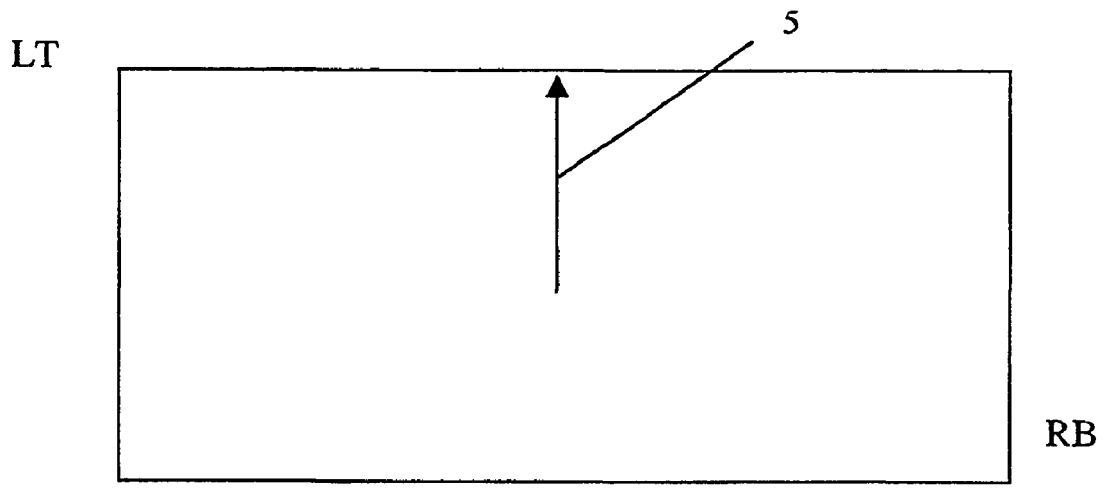
FIGS. 10A and 10B show how rotation rules may be applied to the drawings.
Figure 10B:
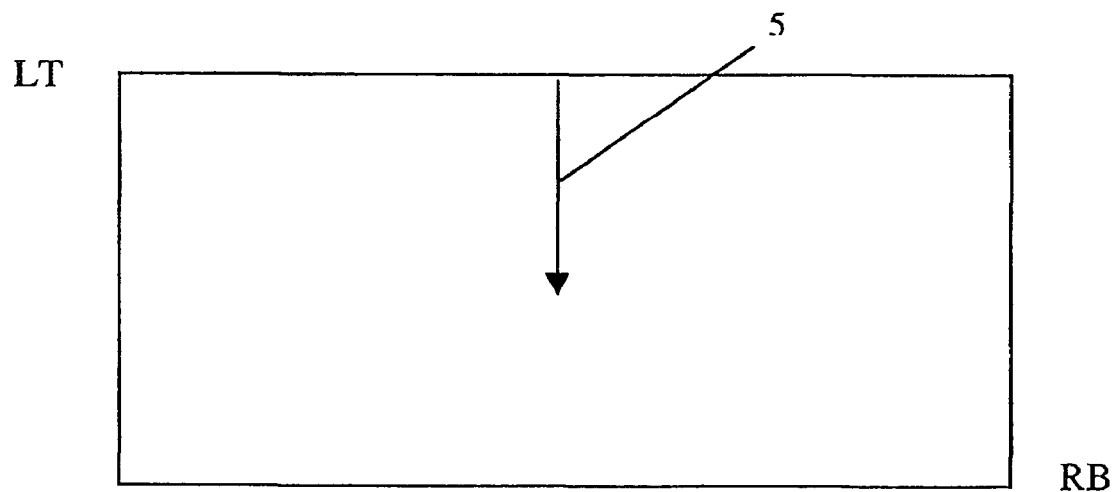

The default is no rotation but all objects can be rotated any angle but mainly 90, 180, or 270 degrees about their centre point. For example, object 5 shown in FIG. 10*a* can be rotated 180 degrees by the attribute: Rotate (180) as shown in FIG. 10*b*. The object reference points refer to the current view of the object (are not rotated with the object) so that RB without rotation is still RB after rotation. In addition, it will be apparent that a panel, including all its contents, can be rotated.

Figure 15:
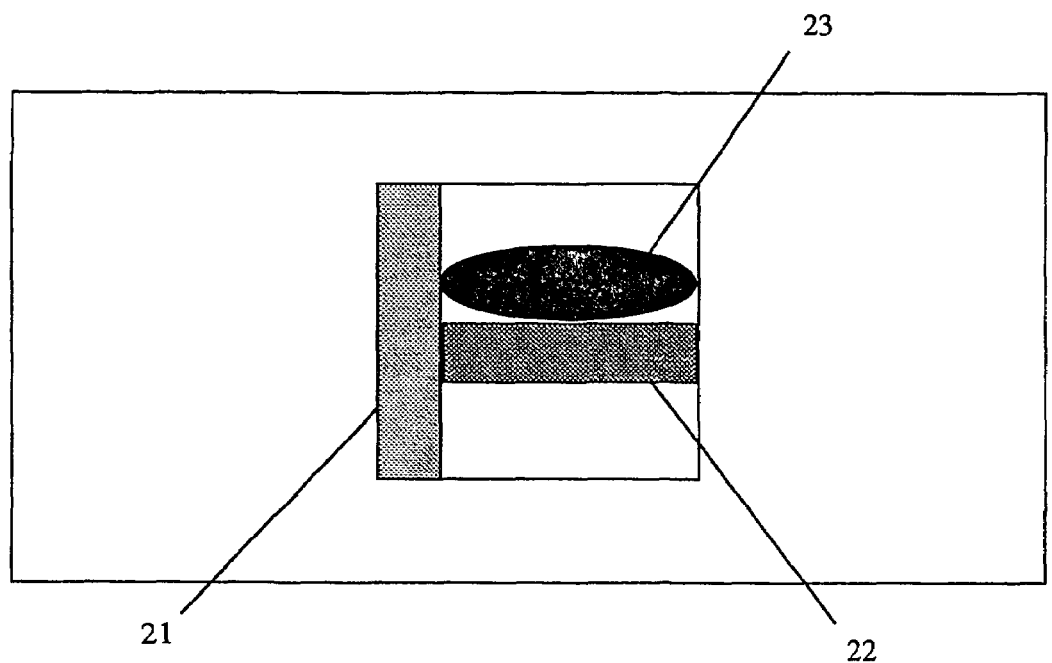
FIG. 15 shows how art objects may be grouped and then centred relative to a panel.

As shown in FIG. 15, grouping art objects before placement is a convenient way to avoid complex arrangements. Art objects can be called, referencing each other to define the relationship within the group, the group can then be located using reference points of the grouped object. Groups also allow objects to have a size relationship to other objects.

The expression group [0(21)RC>0(22)LT+0(22)CT>0(23)CB] (CC)>PCC, groups object 21 right centre with objects 22 left top and objects 23 centre bottom with objects 22 centre top within the group. The group is centred on the panel.

In addition to the foregoing, the system offers the ability to import the artwork from additional panels in a first artwork into a new artwork, whereby an artwork can be created as a compilation of populated panels from other artworks while preserving the rules defined in the creation of those populated panels.

Once the system has completed the compilation of all the artwork aspects into a template to form an artwork it is known as 'Finished Art' and will be circulated for approval by various departments within a company such as R&D, Marketing, Package Development, Production and Legal. In the preferred embodiment, the system uses the PDF file format to facilitate this process so that it can be done electronically in a managed workflow system or using email alone for distribution. It will be apparent that other appropriate formats can be used instead.

When the artwork has been approved the process will move into the prepress phase, where the electronic file which defines the artwork will be prepared for making film negatives for subsequent printing plate manufacture (although emerging technology allows plates to be manufactured directly from the electronic image, this is known as CTP—Computer To Plate). The Prepress phase will involve:

Colour Trapping (overlapping colour regions to ensure that no 'white' space appears between abutting regions if they are slightly out of register/alignment during the print run).

Colour Separation (this is where each colour is extracted from the artwork to a separate image for film and plate making)

Adding register marks (these target like marks are used to align all the separated colour images so that they are 'in register' in the plate making stage). Some systems employ a 'Pin Register' method where fixed locations for mounting pins are mapped into the image.

Disproportionate Scaling to accommodate 'stretch', this is a scaling in one axis to compensate for plate distortion when it is wrapped around the mounting cylinder on the press.

The processes above are used in most package graphics prepress operations. However, in the case of corrugated cardboard which is used to form boxes, the arrangement of artwork elements can be quite sparse over large layout areas (ie big boxes with small amounts of print), it is not economical to produce plates that cover the whole layout area. The normal practice in the corrugated industry is to produce smaller pieces of plate for individual parts of the artwork and then mount these on a backing sheet so that less plate material is used by 'condensing' the plate film image. The problem with this technique is that it is quite time consuming to locate the plate pieces in relation to the box layout, and to each other, in each colour.

The applicant has developed a patented system described in Australian Patent 676068 and called Digiset which makes this process faster and more efficient by linking the mounting process with the electronic image via a grid of location points.

The present system allows some automation of the prepress processes:

Colour trapping can be achieved by: adjusting the 'stroke width' and 'overprint' attributes of art objects if required (these may be preset in the objects themselves eg logos but may need adjusting when the object is resized). The template can also identify which objects need trapping due to their proximity with other objects.

Colour separation: since the objects and their colours are identified in the template it is possible to separate and condense the film images as appropriate.

Adding Register marks, these can be the traditional targets which are placed at the corners of panels (since the pack layout is known), they could be 'Pin Register' holes or Digiset locaters could be placed as appropriate.

Disproportionate Scaling can be envoked on all objects in the template.

This means that the present system can automate the process from art creation through the prepress phase providing film ready files which could be placed in a queue on the image setter and indeed processed automatically by a modern device of this kind. Needless to say if CTP were in place it could proceed automatically to the plate making phase.

Figure 11:
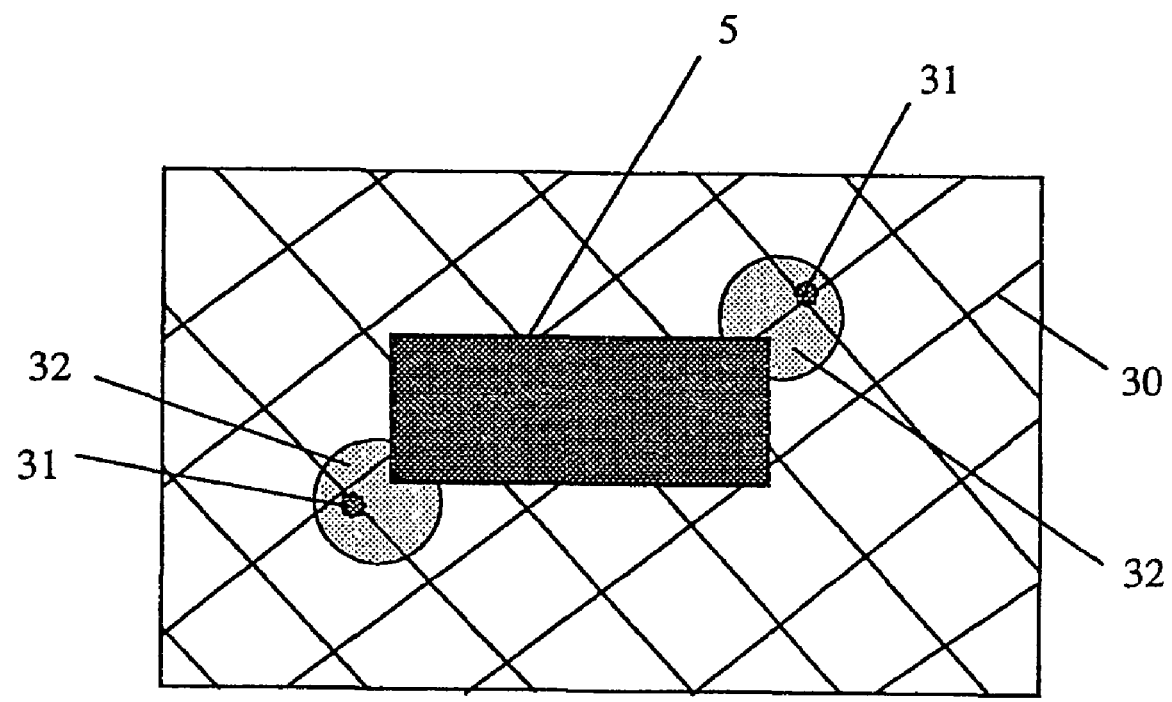
FIG. 11 shows how plate locaters can be used.

Referring to FIG. 11, integration of the Digiset software to place locaters in the appropriate positions involves utilising special regions which are part of the template definition in which locator 31 addresses would be found corresponding to the Digiset grid 30. For example an art object 5 would have regions 32 defined adjacent to it in which the system searches to find an occurrence of a grid location.

The Locating region 32 would have a diameter which ensures at least one locator is found and if two are found the one that is closest to the object (with appropriate clearance) would be selected.

Figure 12:
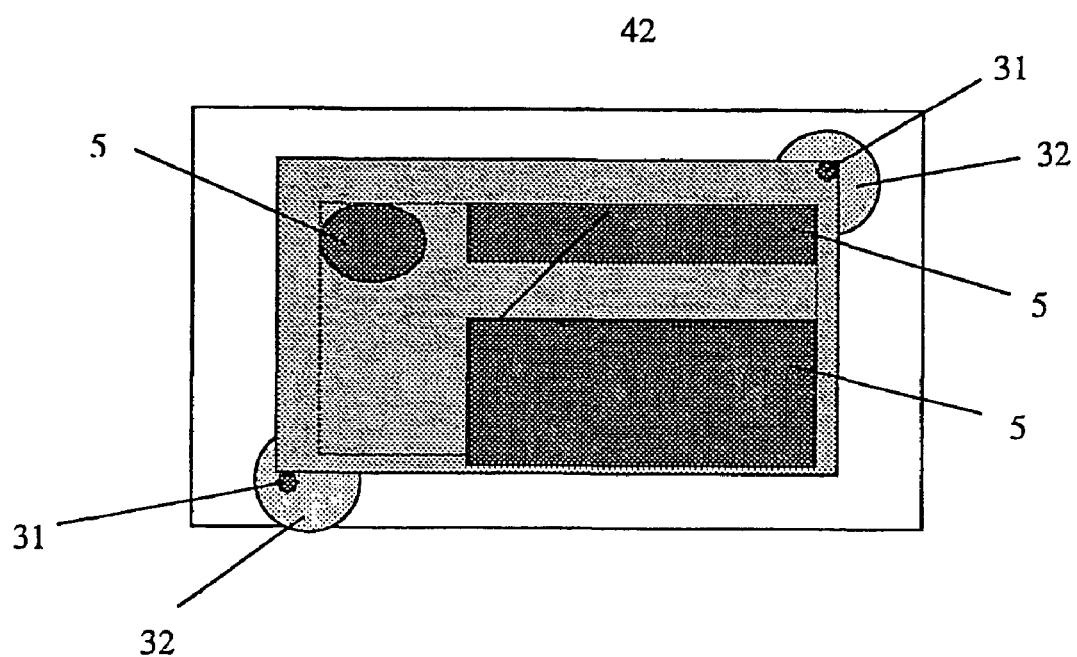
FIG. 12 shows how plates can be extracted from an artwork.

In the example of FIG. 11, the Locating regions apply to a single art object 5 which is situated by itself in the middle of the panel and is appropriate for large format space artworks. The example of FIG. 12 shows that when objects 5 get closer together as the box layout changes (gets smaller), they will be made from one plate piece 42.

Figure 13A:
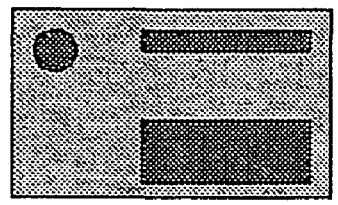
FIGS. 13A, 13B and 13C show various alternative plate generations which are dependent on the size of an artwork.
Figure 13B:
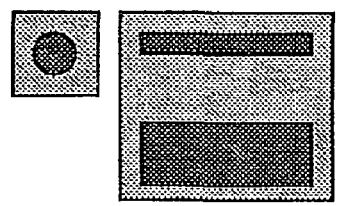
Figure 13C:
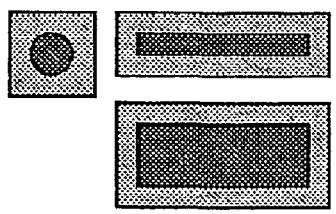

The Template will have the ability to determine different plate piece relationships according to the size of the panel/layout. FIG. 13*a* shows a single piece of plate being used for a small panel, FIG. 13*b* shows two pieces of plate being used for a medium panel and FIG. 13*c* shows three pieces of plate being used for a large panel.

Figure 14A:
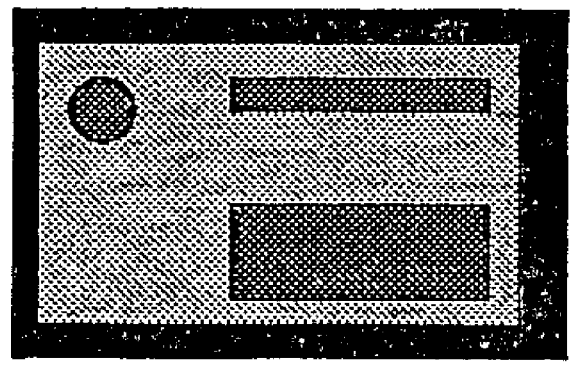
FIGS. 14A and 14B show how plates can be manipulated in order to meet size requirements.
Figure 14B:
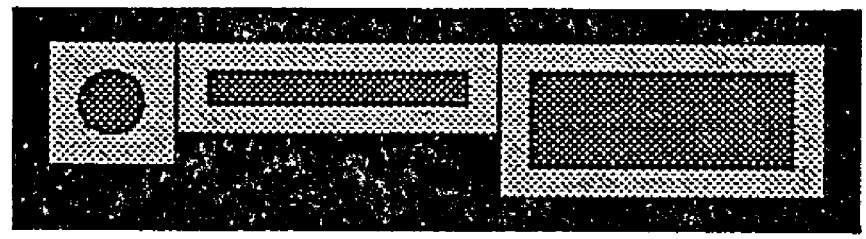

As discussed above the Digiset system allows for minimising of film and plate material by being able to separate plate pieces which can then be condensed in the film image but can be easily relocated on the backing sheet. As shown in FIG. 14a and FIG. 14b, the pieces may also need to be rearranged to fit in the film width for large format work.

Alternatively, the object management information can be embedded in the finished artwork and can be extracted as necessary.

In the preferred embodiment of the second aspect of the invention, the second aspect of the invention is embodied in a graphical user interface GUI which is capable of generating grid, lines which overlay an electronic document which are used to generate an artwork. As will be apparent to persons skilled in the art, the grid lines which are generated in the preferred embodiment do not form part of the document itself. The grid lines of the preferred embodiment allow the area to be sub-divided into a number of regions which can be selected by a user of the GUI in the generation of their artwork.

Figure 21A:
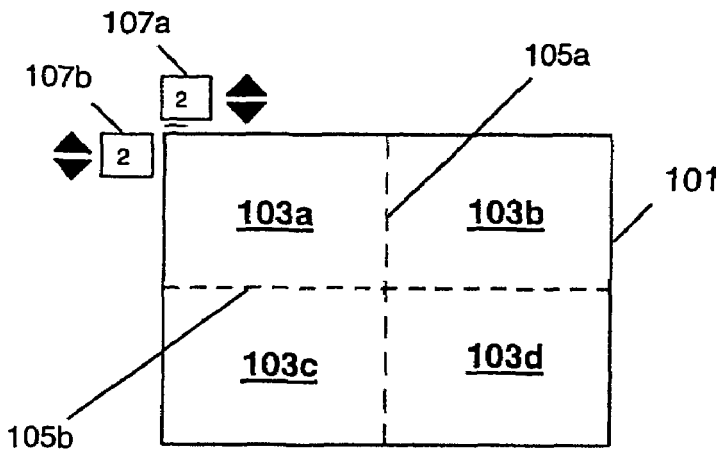
FIGS. 21a, 21b and 21c show how an area of an electronic document can be sub-divided into a plurality of equal sized regions.

Referring to FIG. 21a, it will be seen that the area 101 of an electronic document has been divided into a plurality of sub-regions 103a, 103b, 103c and 103d by grid lines 105a and 105b. The GUI has selection buttons 107a, 107b which can be used to select the number of horizontal, and vertical sub-divisions of the area 101 respectively. The selection buttons 107a, 107b include a toggle which allows a pointing device, such as a mouse, to alter the number of sub-divisions. As shown in FIG. 21a the selection buttons 107a have been used to divide the area into two horizontal and two vertical regions to thereby sub-divide the area into four regions 103a, 103b, 103c and 103d.

Figure 21B:
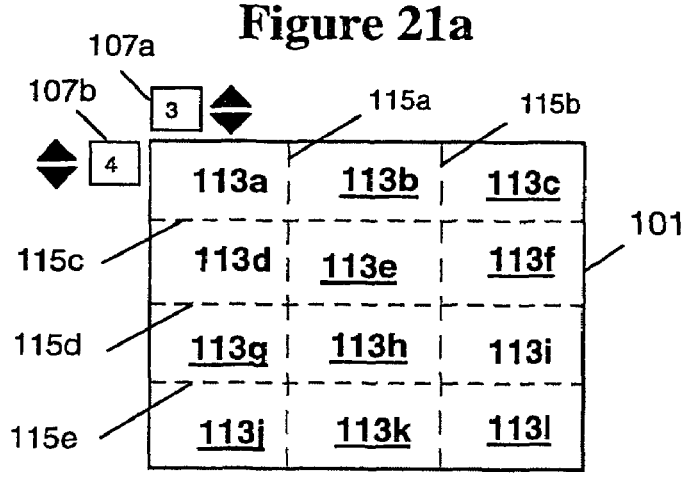

In FIG. 21b, the area 101 has been sub-divided into three horizontal regions and four vertical regions to thereby provide a total of twelve regions 113a-113e.

Figure 21C:
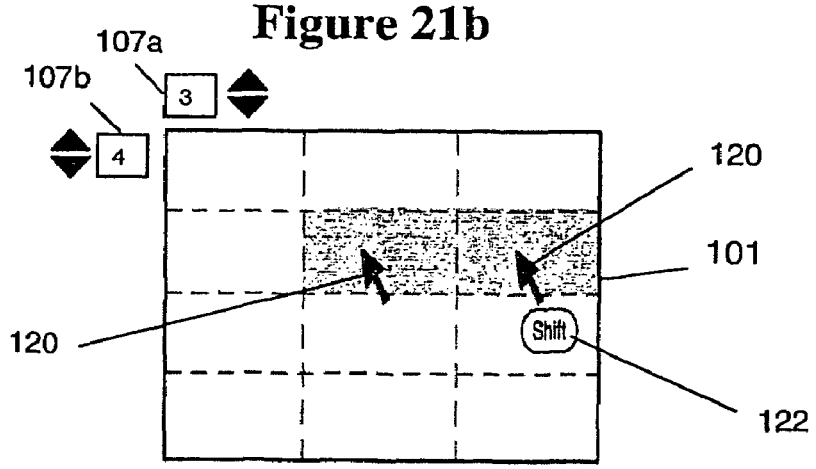

Referring to FIG. 21c, it will be apparent that this Figure shows the same sub-divisions 113a-113e as FIG. 21b, however the individual regions are not numbered for the sake of clarity.

It will be apparent, referring to FIG. 21b, that each region has a perimeter which is defined by segments of lines 115a, 115b, 115c, 115d and 115e.

FIG. 21c, indicates how regions 113e and 113f can be selected using a pointing device—i.e. an electronic mouse—which is represented by arrow 120. Shift indicator 122 is provided, merely to represent that in order to select multiple areas a user must hold down the shift key on an electronic keyboard while selecting the region with a pointing device. Other similar techniques for selecting multiple items known within the art of the design of graphical user interfaces can also be employed.

Figure 22A:
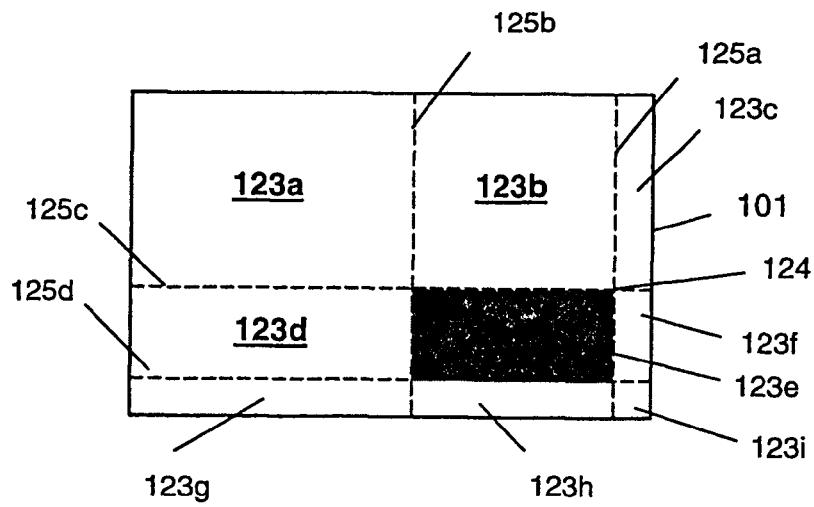
FIGS. 22a, 22b and 22c shows how an area of an electronic document can be sub-divided into a plurality of regions on the basis of the location of objects which said area.

Referring to FIG. 22a, there is demonstrated how an area 101 can be sub-divided into a plurality of regions, 123a to 123i by locating a first object 124 within area 101.

Object 124 is rectangular and is surrounded by a plurality of grid lines 125a, 125b, 125c and 125d to thereby bound the object into a region 123e. For a rectangular object the grid lines continue within the edges of the document and extend to meet the perimeter of area 101. The grid lines thus divide the area 101 into a plurality of rectangular but uneven regions 123a to 123i which depend on the size of the object 124 and its position within the area 101.

Figure 22B:
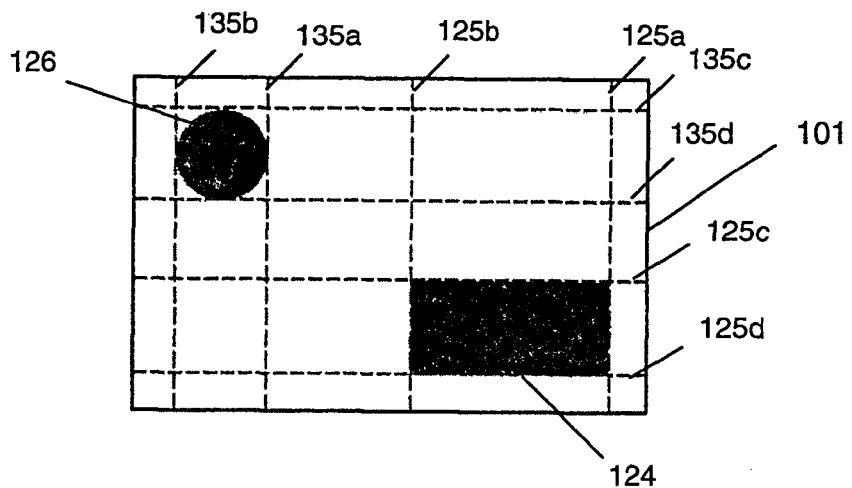

In FIG. 22b, a further object 126 has been located within area 101. It will be apparent that as the object 126 is round, to preserve the creation of purely rectangular regions within area 101, the generation of the grid lines 135a-135d is controlled so that the object 126 is bound by a plurality of grid lines which are parallel to the edges of the area 101. The generation of the grid lines is further controlled so that the region into which object 126 is bound by grid line 135a-135d corresponds to the smallest rectangle in which object 126 fits.

The individual regions of the area 101 as shown in FIG. 22b are not numbered to preserve clarity of the drawings. However, it will be apparent from inspecting the drawings that the plurality of the regions are defined by the co-operation of the grid lines 125a-125d and 135a-135d surrounding objects 124 and 126 and the edges of area 101.

Figure 22C:
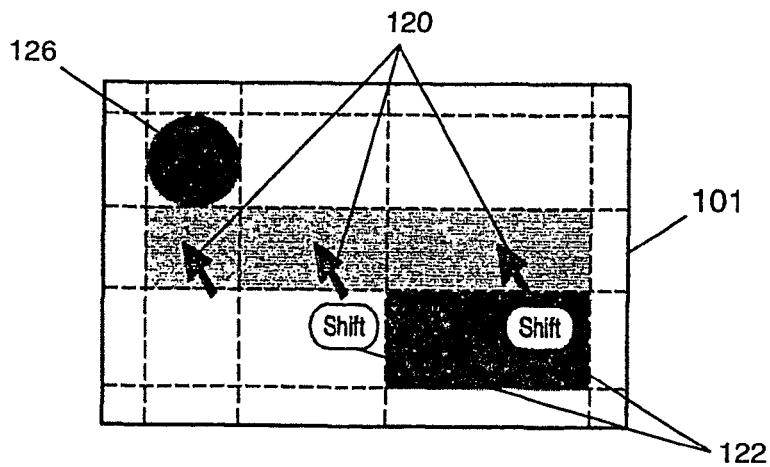

As shown in FIG. 22c, the resultant regions, are selectable using a pointing device represented by arrow 120 in the same manner as the regions selectable in FIG. 21c. In FIG. 22c, there are three regions which are shaded to show that they are being selected and hence it is necessary for the user to hold down the shift key while selecting two of the regions as indicated by shift icons 122.

FIG. 23, shows how regions defined by fixed grid lines as illustrated in FIGS. 21a-21c can be combined with regions defined by objects as illustrated by FIGS. 22a-22c to produce a plurality of smaller selectable regions. FIG. 23 further demonstrates how such regions can be selected by using a pointing device to point to the lines which form the border of a composite region which consists of a series of sub-regions.

Composite region 130 is formed from a plurality of regions by using a pointing device to click on lines 135c, 115d, 125d and 115a. It can be seen that this technique has been used to select a region 130 which is wholly above the centre line 115d, which aligns with the grid line passing through the right edge of object 124—i.e. line 125d and which also aligns with the line passing through the top of object 126—i.e. line 135c. This allows the person creating the artwork within area 101 to define a region which is in balance relative to both the overall area 101 and objects located within the area 101.

The code necessary to generate the present GUI is within the skills of a skilled programmer or skilled team of programmers. In the preferred embodiment means are provided to allow a person to distinguish between gird lines defined as the result of the incorporation of objects within the area 101 and fixed grid lines. In the preferred embodiment these lines are shown to be different in nature by being drawn in different colours on a computer display.

It is apparent that various modifications could be made to the method and system of the present invention without departing from the scope and spirit of the invention. For example, alternative means can be used to highlight that a particular region has been located. Or equivalent key board commands can be provided which allow a user to select one or more regions.

Further, it will be apparent that the function which generates both the fixed and object generated grid lines can be switched on and off as desired by the user of the GUI. For example, once the user has located a number of major objects within area 101 the user may turn-off the object grid function while objects are added to avoid the generation of further grid lines.

In a modified embodiment, the system of the second aspect of the invention provides the ability to create new grid lines by offsetting from existing grid lines or panel edges. That is, the system includes the ability to define new grid lines by offsetting them from existing grid lines or panel edges. The offset can be a fixed dimension or a percentage of the panel width or height. This is useful where a region needs to be defined which has a fixed width or height and extends across the panel at a fixed dimension from the panel edge. This type of region is often used for clear areas which have information such as "best before" dates etc ink jet printed on the packing line.

In a still further modification, additional grid lines may be generated automatically relative to the centres of object. Again, this feature can be toggled on and off.

It will be apparent that the second aspect of the A invention can be used advantageously in combination with the first aspect of the invention, not only to provide a graphical user interface to allow a user to incorporate objects into an artwork but also to allow a visual representation to be made of various of the rules. For example, a clear space rule can be represented by automatically generating a grid line offset by a certain distance from the object.

Grid lines can also be used to provide a visual indication of a region defined by the intersection of the regions which are left of the insertion of two objects into a panel such as region 15 which is illustrated in FIG. 7.

It will be apparent that while the notation used herein provides a convenient description of how objects should be positioned etc, this notation need not be used to implement the invention. For example, in an XML implementation, the notation OCT>PCC can be represented using XML tags and attributes such as: <Position Object_Anchor="CT" Reference_Id="P(3,2) " Reference_Anchor="CC"/>. That is, a specific XML grammar can be defined.

Various modifications to the system will be understood as being within the scope of the system described herein.

The claims defining the invention are as follows:

1. A system for creating an artwork, said system having:
    artwork creation means for creating an artwork incorporating an art object;
    control means for controlling the manner in which an art object can be incorporated into said artwork in accordance with a rule,
    wherein when said artwork creation means is creating an artwork incorporating an art object, said art object control means controls the incorporation of said art object into the artwork to ensure that it is in accordance with said rule, wherein the artwork creation means defines a template corresponding to a package and creates said artwork by incorporating art objects into said template, and wherein said template corresponds to a blank layout of the package; and
    rule update means for updating a rule associated with an artwork,
    whereafter said art object control means controls said artwork to be updated in accordance with the updated rule, wherein said system is used to create a plurality of artworks and said artworks are maintained in a artwork database, and wherein said rule update means includes a rule database and when a rule change is made to said rule database said rule update means examines said artwork database and updates artworks relating to said rule change in accordance with said rule change.

2. A system as claimed in claim 1, wherein said artwork is packaging artwork.

3. A system as claimed in claim 1, wherein said artwork creation means divides said template into a plurality of areas which correspond to panels of said package.

4. A system as claimed in claim 1, wherein said control means controls the manner in which an art object can be incorporated in said template in accordance with a rule associated with said template.

5. A system as claimed in claim 1, wherein said control means controls the manner in which an art object can be incorporated in accordance with a rule associated with said object.

6. A system as claimed in claim 1, wherein said artwork creation means can modify an existing artwork and said art object control means controls the modification to ensure that it is in accordance with any rules associated with any art objects incorporated in said artwork.

7. A system as claimed in claim 6, wherein when the modification of said artwork involves a change from a first template to a second template, said art object control means controls the modification so that an art object is incorporated within the second template in accordance with the manner in which it was incorporated within the first template.

8. A system as claimed in claim 7, wherein the modification is controlled to preserve the relative position of the art object.

9. A system as claimed in claim 7, wherein the modification is controlled to preserve the relative scaling of the art object.

10. A system as claimed in claim 1, wherein said rule is selected from one of:
    a colour rule;
    a logo rule;
    a scale rule;
    a placement rule;
    a trapping rule;
    an overprint rule;
    a size rule;
    a panel rule; and
    a blank space rule.

11. A system as claimed in claim 1, wherein said artwork creation means defines a grid relative to which art objects can be located.

12. A system as claimed in claim 1, wherein said system has an input means and said artwork is at least partly created by a user using said input means.

13. A system as claimed in claim 1, wherein said system has an output means in the form of a display and said artwork is displayed on said display.

14. A method of creating an artwork, said method including:
    creating an artwork by incorporating an art object into an artwork,
    controlling the manner in which said art object can be incorporated into the artwork in accordance with a rule, whereby when an artwork is created incorporating an art object, the incorporation of said art object is controlled to ensure that it is in accordance with said rule,
    defining a template corresponding to a package, wherein creating said artwork includes incorporating art objects into said template, and wherein said template corresponds to a blank layout of said package,
    updating a rule associated with an artwork and controlling said artwork to be updated in accordance with the updated rule,
    using said system to create a plurality of artworks and maintaining said artworks in an artwork database, and
    examining said artwork database and updating artworks relating to a rule change in accordance with said rule change when said rule change is made to a rule database.

15. A method as claimed in claim 14, wherein said artwork is packaging artwork.

16. A method as claimed in claim 14, further including dividing said template into a plurality of areas which correspond to panels of said package and locating art objects within said panels.

17. A method as claimed in claim 14 wherein said method involves controlling the manner in which an art object can be incorporated in accordance with a rule associated with said template.

18. A method as claimed in claim 14, involving controlling the manner in which an art object can be incorporated in accordance with a rule associated with said art object.

19. A method as claimed in claim 14 further including:
modifying an artwork and controlling the modification of the artwork to ensure that it is in accordance with any rules associated with any art objects incorporated in said artwork.

20. A method as claimed in claim 14, further including:
modifying an artwork and controlling the modification so that when an art object is incorporated within a changed template it is incorporated in accordance with the manner in which it was incorporated within the original template.

21. A method of dividing an area of an electronic document into a plurality of selectable regions, the method including the steps of:
establishing an electronic document area;
locating within the document area an object to form part of an electronic document;
surrounding said object with a plurality of grid lines to bound said object into a region;
said grid lines extending to the perimeter of said document area to thereby divide said document area into a plurality of regions;
permitting selection of any one of said plurality of regions; and
generating a plurality of further grid lines parallel to the edges of said area, whereby said further lines co-operate with the grid lines surrounding each object to divide said area into a plurality of regions.

22. A method as claimed in claim 21, wherein said regions are rectangular.

23. A method as claimed in claim 21, wherein involving surrounding said object with grid lines which are parallel to respective edges of said area.

24. A method as claimed in claim 21, wherein selection of a plurality of regions is permitted.

25. A method as claimed in claim 21, including locating a plurality of objects within said area and surrounding each said object with a plurality of grid lines, whereby the grid lines which surround each object co-operate to divide said area into a plurality of regions.

26. A method of dividing an area of an electronic document into a plurality of selectable regions, the method including the steps of:
establishing an electronic document area;
locating within the document area an object to form part of an electronic document;
surrounding said object with a plurality of grid lines to bound said object into a region;
said grid lines extending to the perimeter of said document area to thereby divide said document area into a plurality of regions; and
permitting selection of any one of said plurality of regions,
wherein surrounding said object with grid lines involves surrounding said object by the smallest rectangle into which said object fits.

27. A system for dividing an area of an electronic document into a plurality of selectable regions, the system including:
a display means;
a computer programmed to establish an electronic document area and to display said document area by means of said display,
said computer being operable by a user to locate within the document area an object to form part of an electronic document,
said computer being programmed to surround said object with a plurality of grid lines to bound said object into a region,
said grid lines extending to the perimeter of said document area to thereby divide said document area into a plurality of regions, and
said computer being operable to permit selection of any one of said plurality of regions by a user,
wherein said computer is operable to generate a plurality of further grid lines parallel to the edges of said area in response to a user command, whereby said further lines co-operate with the grid lines surrounding each object to divide said area into a plurality of regions.

28. A system as claimed in claim 27, wherein said computer is programmed to surround said object with grid lines which are parallel to respective edges of said area.

29. A system as claimed in claim 27, wherein said computer is operable to permit the selection of a plurality of regions.

30. A system as claimed in claim 27, wherein said computer is operable to locate a plurality of objects within said area and said computer is programmed to surround said object with a plurality of grid lines, whereby the grid lines which surround each object cooperate to divide said area into a plurality of regions.

31. A system as claimed in claim 27, wherein said system includes a pointing device operable to select a region by being operated to point within said region.

32. A system as claimed in claim 27, wherein said system includes a pointing device operable to select a region by being operated to point which the grid lines which comprise the perimeter of said region.

33. A system for dividing an area of an electronic document into a plurality of selectable regions, the system including:
a display means;
a computer programmed to establish an electronic document area and to display said document area by means of said display,
said computer being operable by a user to locate within the document area an object to form part of an electronic document,
said computer being programmed to surround said object with a plurality of grid lines to bound said object into a region,
said grid lines extending to the perimeter of said document area to thereby divide said document area into a plurality of regions, and
said computer being operable to permit selection of any one of said plurality of regions by a user,
wherein said computer is programmed so that said grid lines surrounding said object bound said object by the smallest rectangle into which said object fits.

* * * * *